United States Patent [19]
Landru et al.

[11] Patent Number: 6,164,158
[45] Date of Patent: Dec. 26, 2000

[54] DEVICE FOR RAPID SECUREMENT OF A SHOE ON A BICYCLE PEDAL

[75] Inventors: Marc Landru, Nevers; Remy Lachat, Martin D'Heuille, both of France

[73] Assignee: Look Cycle International, Nevers, France

[21] Appl. No.: 09/299,636

[22] Filed: Apr. 27, 1999

[30] Foreign Application Priority Data

Apr. 27, 1998 [FR] France .................................. 98 05236

[51] Int. Cl.[7] ...................................................... B62M 3/08
[52] U.S. Cl. .................................................................. 74/594.6
[58] Field of Search ............................... 74/594.6, 594.4; 36/131

[56] References Cited

FOREIGN PATENT DOCUMENTS 26 95902  3/1994  France .
27 19231  11/1995  France .

*Primary Examiner*—Mary Ann Green
*Attorney, Agent, or Firm*—Young & Thompson

[57] ABSTRACT

A quick coupling device for bicyclists includes a plate permanently fixed below the sole of the shoe and a securement for the plate on the upper surface of the pedal. The securement includes a front cleat and a rear cleat movably mounted in a direction perpendicular to the axle of the pedal, and a control for the cleats. The control includes a hydraulic circuit integrated into the pedal and hydraulic control members disposed on the pedal and actuated by the plate.

17 Claims, 4 Drawing Sheets

DEVICE FOR RAPID SECUREMENT OF A SHOE ON A BICYCLE PEDAL

CROSS REFERENCE TO RELATED APPLICATIONS

This application corresponds to French application 98.05236 of Apr. 27, 1998, the disclosure of which is incorporated herein by reference.

BACKGROUND OF THE INVENTION

The invention relates to the rapid securement of a shoe on a bicycle pedal.

DESCRIPTION OF THE RELATED ART

Known securements of this type comprise a plate permanently fixed below the shoe sole and coupling means for the plate to the upper surface of the pedal. These coupling means are generally constituted by a fixed front cleat and a movable rear cleat continuously urged by resilient means in the direction of the front cleat.

The plate has an overall triangular shape with a summit directed forwardly and comprises a front recess and a rear recess which, with the surface of the sole, form respective notches in which the respective front and rear cleats engage to secure the plate with the shoe against the pedal.

These securements comprise control means for the coupling and uncoupling of the plate wherein these control means are constituted by incline surfaces disposed on the one hand on the plate and on the other hand on the movable cleat.

For coupling, the summit of the triangle formed by the plate defines a nose which is engaged below the front cleat, whilst the plate comprises at its rear portion an incline surface that comes to bear against an end surface, also inclined, of the rear cleat, to cause the latter to pivot in the opposite direction relative to the front cleat so as to space the cleats from each other and to permit the plate to pivot downwardly such that the rear cleat can engage in the rear notch of the plate.

For uncoupling, the plate comprises in the rear recess two oppositely inclined surfaces which are located respectively in contact with a complementary surface of the rear cleat, or adjacent the latter, when the plate is gripped between the cleats. A slight lateral rotation of the plate has the result that, as a function of the direction of rotation, one or the other of the inclined surfaces pushes back the rear cleat to space the front cleat thereby to free the plate from its grip between the cleats.

SUMMARY OF THE INVENTION

The invention has for its object to provide a securement of quite a new type, which permits the user to take a natural position rapidly and easily without having to adjust the plate below the shoe, whilst permitting very progressive gripping of the plate between the front and rear cleats. The securement according to the invention thus permits coupling the plate to the pedal without immediately blocking the foot because the user can slightly swing the latter laterally or angularly without loosening the shoe, which permits the user to find a natural position suitable for him.

The invention has for its object a device for rapid securement of a shoe on a bicycle pedal, comprising a plate permanently fixed below the sole of the shoe and securement means for the plate on the upper surface of the pedal, said securement means comprising a front cleat and a rear cleat, at least the rear cleat being movably mounted in a direction perpendicular to the axis of the pedal, and control means for the securement means, characterized in that said control means comprise a hydraulic circuit integrated into the pedal, and hydraulic control members disposed on the pedal and actuated by the plate.

According to other characteristics of the invention:

the control members comprise a principal jack actuated by the lower surface of the plate, the principal jack being connected to a reservoir of hydraulic liquid by an intake conduit on the one hand and by a return conduit on the other hand, the principal jack being connected by a conduit to at least one control member of the securement, constituted by a gripping jack for the movable cleat, the conduit comprising a branch opening into a pressure accumulator;

the principal jack is moreover connected by a conduit to a control member for the securement, constituted by at least one securement jack for the movable cleat, the conduit comprising a branch opening into a prestressed pressure accumulator;

the cross-section of the conduit connected to the coupling jack is greater than that of the conduit connected to the gripping jack so as to permit the coupling jack to be actuated first;

each conduit connected to the principal jack comprises respectively a non-return valve;

a hydraulic control member for releasing the plate is disposed on the upper surface of the pedal and is actuated by a lateral appendix of the pedal;

the control member for freeing the plate is constituted by a slide having an open position and a closed position, this slide being connected to a branch of the conduit connected to the coupling jack and a branch of the conduit connected to the gripping jack on the one hand, and to the reservoir on the other hand, so as to permit, when it is in the open position, to establish communication of said conduits with the reservoir;

the front cleat is also movably mounted and controlled by hydraulic means analogous to those which control the rear cleat and which are integrated in the same hydraulic circuit as the latter;

the conduit connecting the principal jack to the gripping jack or jacks is moreover connected to the reservoir by a branch in which is inserted a constriction;

the movable cleat or cleats are constantly urged by resilient means to space them from each other;

the movable cleat comprises a lever extending substantially perpendicularly to the body of the cleat and co-acting with one or two control jacks for moving the cleats toward each other for the securement of the plate on the pedal;

the principal jack is constituted by an inflatable dome of a resilient material;

the jacks constituting the control members for the securement are constituted by membranes;

the hydraulic circuit moreover supplies a hydrostatic bearing in which the pedal axle is disposed;

the hydrostatic bearing is inserted in the return conduit toward the reservoir;

a pressure accumulator is connected upstream of the hydrostatic bearing;

the constricted branch is connected to the hydrostatic bearing.

BRIEF DESCRIPTION OF THE DRAWINGS

Other characteristics and advantages of the invention will become apparent from the description which follows, with reference to the accompanying drawings, which show by way of example an embodiment of the securement according to the invention. In the drawings.

DESCRIPTION OF THE PREFERRED EMBODIMENT

Figure 1:
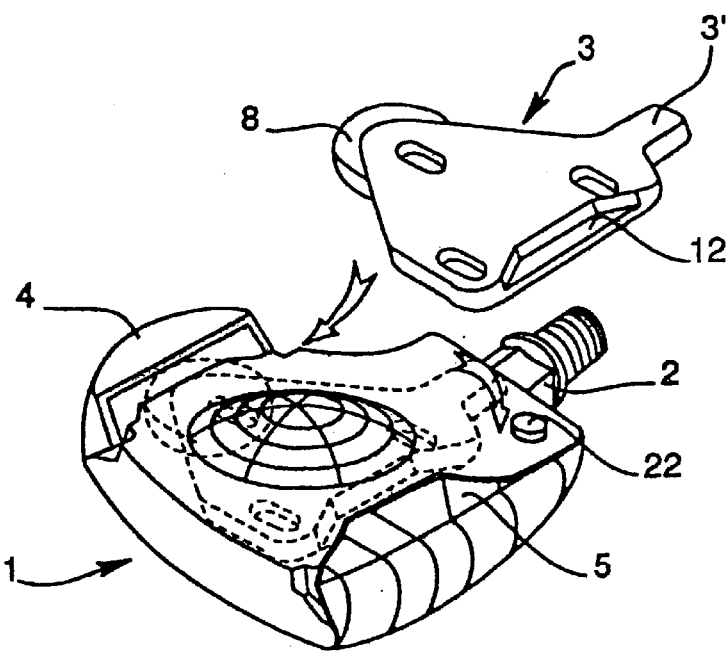
FIG. 1 is a perspective view showing a plate and a pedal according to the invention.
Figure 2:
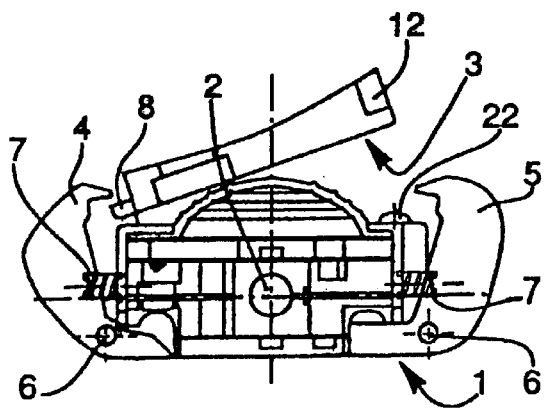
FIGS. 2 and 3 are axial cross-sections of a plate and a pedal, showing respectively the position of the plate at the beginning of securement of the latter to the pedal and the position of the plate when it is gripped between the two cleats.
Figure 3:
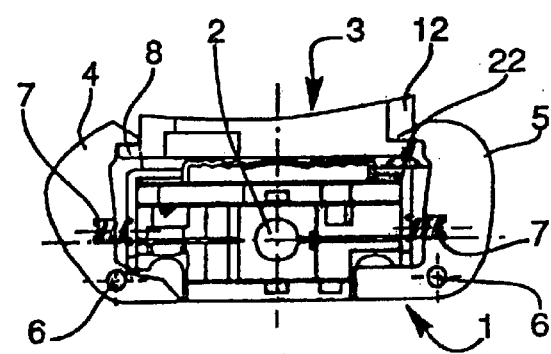
Figure 4:
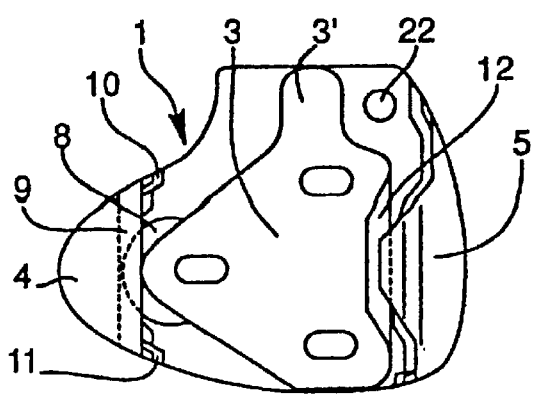
FIGS. 4 and 5 are views from above of a plate and of a pedal, showing respectively the position of the plate when it is gripped between the two cleats and the plate upon uncoupling the latter.
Figure 5:
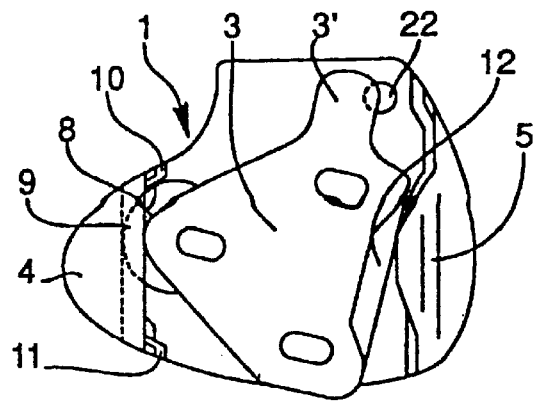

FIGS. 1 to 5 show a pedal 1 traversed by a transverse rotational axle 2 by means of which it is mounted, in a conventional manner per se, on the pedal crank (not shown). The pedal is provided with a device for securement of a shoe (not shown) on the pedal by means of a plate 3, itself permanently fixed below the sole of the shoe. The plate 3 is constituted by a thin plate having an overall triangular shape and it is secured to the sole by screws.

The securement device comprises means for securing the plate 3 on the pedal 1, these means comprising a front cleat 4 and a rear cleat 5. In the example shown in the figures, the two cleats are pivotally mounted in the longitudinal direction of the pedal on respective pivotal axles 6 extending in the transverse direction of the pedal.

The cleats 4, 5 are permanently urged in opposite directions by resilient means which, in the illustrated example, are constituted by coil compression springs 7. As a result, when the securement device is located in the rest condition, which is to say not actuated, the cleats 4, 5 are maintained spaced to facilitate the emplacement of the plate 3 between the latter for its securement.

To permit its securement, the plate 3 is at its front end in a known manner provided with a nose 8 adapted to engage in a retaining recess 9 provided in the end of the front cleat 4. The nose 8, in the illustrated example, has the general shape of the arc of a circle and its lateral movement is limited by lateral abutments 10 and 11 disposed on the upper surface of the body of the pedal. These abutments are inclined forwardly of the pedal to guide and center roughly the plate 3 during its emplacement on the pedal 1.

The abutments are disposed so as to create a certain lateral play between themselves and the contour of the nose 8 of the plate. During a rotation of the plate to unhook the latter from the cleats 4, 5, the nose 8 comes into bearing against one or the other of the lateral abutments 10, 11 by carrying out this rotational movement about a notation point which will thus be slightly offset to the side.

To permit securement with the rear cleat 5, the plate is moreover provided with a rear recess 12 which defines with the sole of the shoe a notch for reception of the point of the rear cleat. This recess 12 comprises on the sides, incline control surfaces 12' which coact in a known manner with complementary surfaces on the cleat 5. These control surfaces are adapted to permit quick release by spacing the front and rear cleats 4, 5 forcibly apart, which gives rise, in the hydraulic circuit, to a reaction which will carry out the spacing of the cleats as is described below with reference to FIG. 12 (release).

As already mentioned, the front and rear cleats 4, 5 are maintained spaced by springs 7 to receive the plate. The plate is emplaced on the pedal and then gripped and locked on the pedal with the aid of hydraulic means which will now be described in detail.

The coupling and uncoupling control means of the plate 3 on the pedal 1 comprise a hydraulic circuit integrated into the pedal and hydraulic control members disposed on the pedal and actuated by the plate.

The structure and operation of this hydraulic circuit are illustrated on FIGS. 6 to 12. In the group of FIGS. 7 to 12, the conduits used during the corresponding phase are indicated in black and the movable pieces thus actuated are indicated in gray. The hydraulic liquid is an oil which can be taken to be incompressible by its nature.

Figure 6:
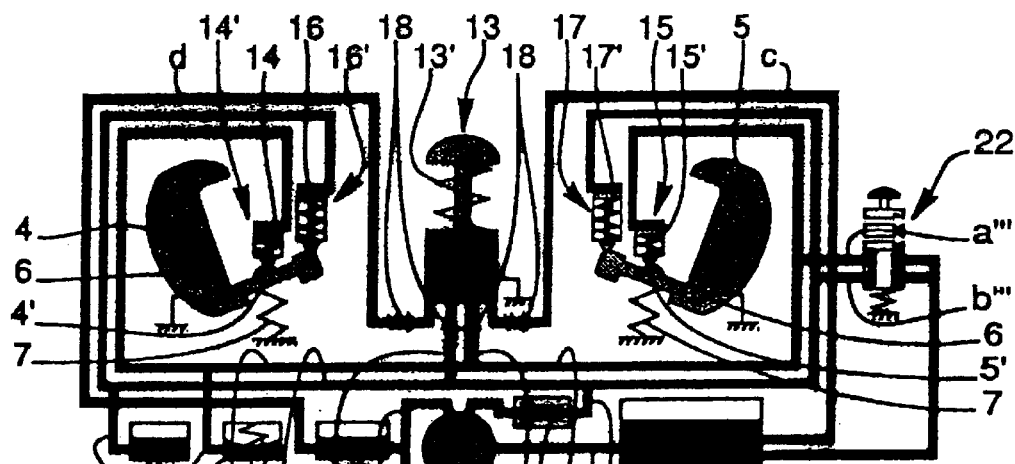
FIG. 6 shows schematically the hydraulic circuit according to the invention in a rest position.

FIG. 6 shows the hydraulic circuit in the rest phase or awaiting the plate 3 before being locked on the pedal 1. The circuit comprises a control member 13 for coupling and gripping the plate 3 on the pedal 1. The control member 13 is constituted by a principal jack whose piston is continuously urged outwardly by a resilient member 13'. This first member is actuated by the large lower face of the plate 3 when the latter is emplaced on the pedal.

The principal jack 13 is by means of a conduit a, a' connected to a respective coupling jack 14, 15 of the front and rear cleats 4, 5. The end of the piston rod of each coupling jack 14, 15 rests against a lever 4', 5' of the respective cleat 4, 5, this lever extending substantially perpendicular to the body of the cleat and being continuously urged toward the end of the corresponding piston rod by the spring 7 already mentioned, which spaces the front and rear cleats from each other. The piston of each coupling jack 14, 15 is moreover continuously urged inwardly of the jack by a resilient member 14' 15'.

The principal jack 13 is by means of a conduit b, b' connected to a respective clamping jack 16, 17 of the front and rear cleats 4, 5. The cross-section of the conduit b is, for reasons which will be explained below, smaller than that of the conduit a and correspond substantially to half this latter.

The end of the piston rod of each gripping jack 16, 17 rests as for the coupling jacks, against the lever 4', 5' of the respective cleat 4, 5, near the end of the lever. The piston of each gripping jack 16, 17 is, as for the coupling jacks, continuously urged inwardly of the jack by resilient means 14', 15'.

Each of the conduits a, b is provided with a non-return valve 18 preventing the hydraulic liquid to return toward the principal jack 13.

The principal jack 13 is supplied from a hydraulic liquid reservoir 19 to which it is connected by the supply conduit c on the one hand and by a return conduit d on the other hand.

To maintain the pressure in the conduits a' and b', the latter are moreover provided with a respective branch a", b" opening into a respective pressure accumulator 20 and 21. The accumulator 21 is provided with a resilient member 21' whose force acts against filling of the accumulator and it is accordingly necessary to overcome this force to fill the accumulator 21. This particularity gives a prestress to the accumulator and its function is explained below with reference to FIG. 12.

Not only the conduit a' but also the conduit b' is connected to the reservoir 19 by a respective return conduit a''', b''' in which is inserted an uncoupling and ungripping control member 22. This control member 22 is constituted by a slide with two positions, namely a first in which it closes the passage in the return conduits a''', b''' toward the reservoir 19, and a second position in which this passage is open to place the return conduits a''', b''' in communication with the reservoir. This control member is actuated by a lateral appendix 3' of the plate which, when this latter is pivoted in its own plane, comes to bear against the control member.

The hydraulic circuit preferably comprises a hydrostatic bearing which carries the axle of pedal 2 on a hydraulic liquid cushion, in place of conventional ball-bearings.

This hydrostatic bearing comprises a cylindrical recess 23 in which the pedal axle 2 is maintained by a cushion (not shown) with an interstice delimited between the wall of the recess and the cylindrical surface of the axle. The recess 23 comprises on the side of the pedal crank an O-ring seal (not shown) through which passes the axle of pedal 2.

The recess 23 is inserted in the return conduit d, between the reservoir 19 and the pressure accumulator 24. So as better to distribute the hydraulic liquid in the interstice between the wall of the recess 23 and the axle of pedal 2, the return conduit d is preferably immediately upstream of the recess divided into at least two branches d' opening into the interior of the recess at regular spaced positions. The recess 23 is connected to the reservoir by a conduit d" which constitutes the last section of the return conduit d.

The conduit b' supplying the gripping jacks 16, 17 preferably comprises a branch b"" which connects it to the recess 23 by a constriction 25, which permits the hydraulic liquid to return to the reservoir 19 by passing through the hydrostatic bearing to lubricate it.

Figure 13A:
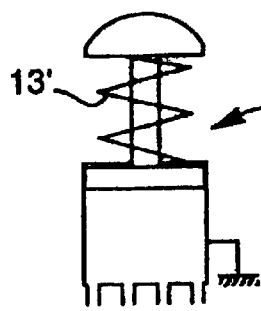
FIGS. 13a and 13b show respectively the symbol used in FIGS. 6 to 12 and the use of a member of the hydraulic circuit.
Figure 13B:
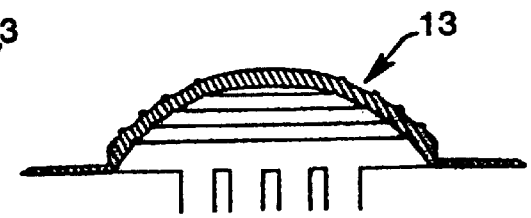

FIGS. 13a, 13b show the symbol used to designate the principal jack respectively an embodiment of this latter.

It is constituted by an inflatable dome of rubber or other flexible resilient materials.

Figure 14A:
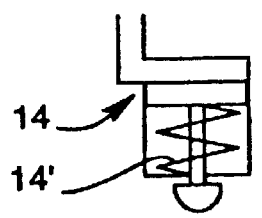
FIGS. 14a and 14b show respectively the symbol used in FIGS. 6 to 12 and the use of a member of the hydraulic circuit.
Figure 14B:
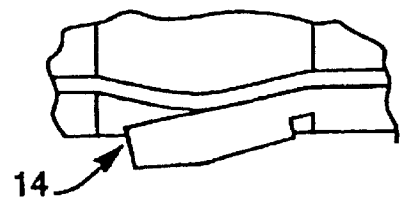

FIGS. 14a, 14b show the symbol used to designate a jack such as the coupling jack 14, respectively an embodiment of this latter. It is constituted by a rubber membrane.

Figure 15A:
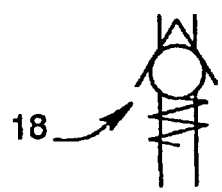
FIGS. 15a and 15b show respectively the symbol used in FIGS. 6 to 12 and the use of a member of the hydraulic circuit.
Figure 15B:
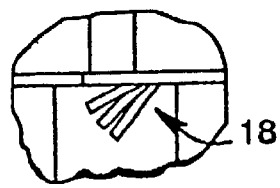

FIGS. 15a, 15b show the symbol used to designate a non-return valve, respectively an embodiment of this latter, this valve being constituted by a rubber valve.

The operation of securement according to the invention will now be explained with reference to FIGS. 7 to 12.

1st phase: Rest (FIG. 6)

This phase is a rest phase or non-use phase when the front and rear cleats 4, 5 are spaced from each other to receive the plate for coupling and gripping of this latter against the pedal.

Figure 7:
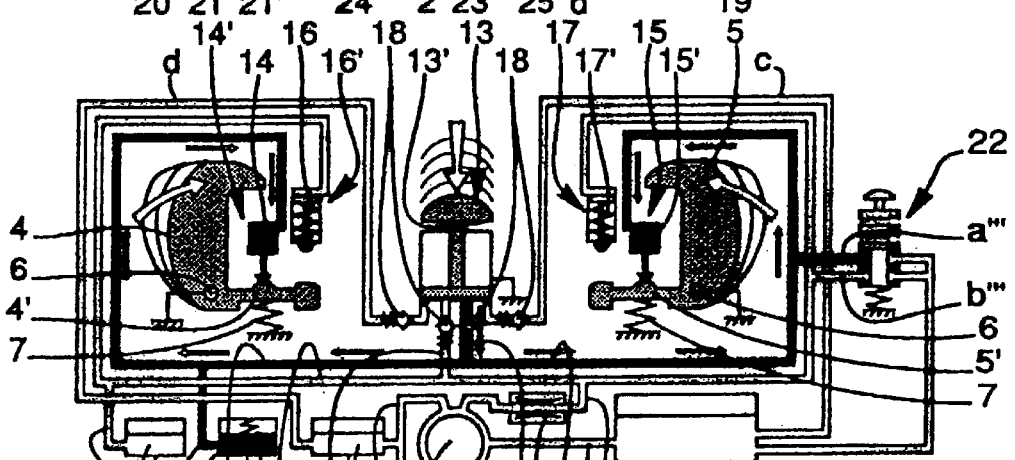
FIG. 7 shows schematically the hydraulic circuit in a coupling phase of the plate to the pedal.

2nd phase: Coupling (FIG. 7)

When the user places the nose 8 of the plate 3 below the point of the front cleat 4 and then presses with the under surface of the plate against the dome 13, operating the principal jack, the liquid therein will be expelled, first into the conduit a which is larger than the conduit b, which will give rise to an extension of the piston rods of the coupling jacks 14, 15. The front and rear cleats 4, 5 will then close together and the plate is thus coupled to the pedal, without being locked. The user can again move his foot laterally within the limit of the two lateral abutments 10, 11 or carry out a slight rotation of the foot without uncoupling from the cleats, which permits him to find the best position for the foot. Once the two feet are coupled, the user begins to pedal, which gives rise to the pumping of the principal jack 13.

Figure 8:
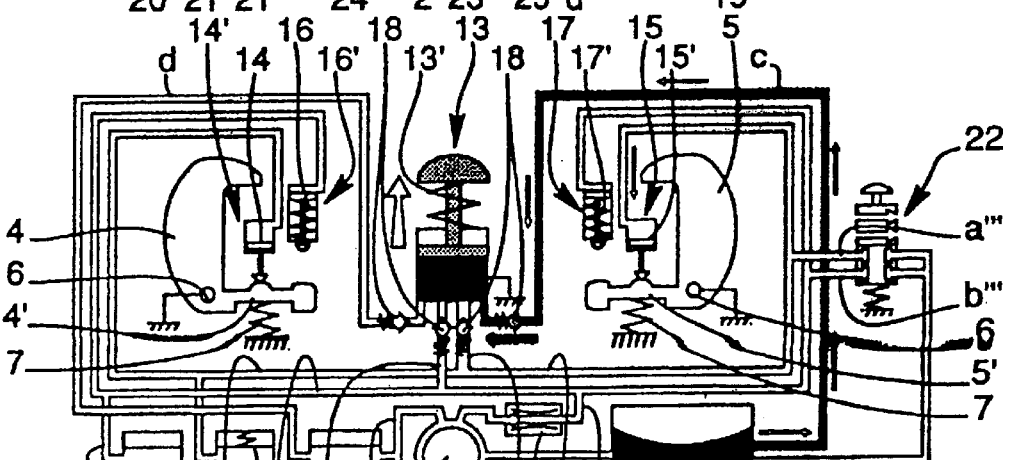
FIG. 8 shows schematically the hydraulic circuit in an intake phase.

3rd phase: Intake (FIG. 8)

When the piston of the principal jack 13 rises under the influence of the resilient member 13', in this case obtained by the innate elasticity of the dome, it creates a suction in the jack chamber. Hydraulic liquid is then drawn from the reservoir 19 by the conduit c to fill the jack chamber. During the descent of the piston of the principal jack within the framework of phases 4 and 5, the non-return valves 18 prevent the liquid from returning to the jack chamber.

Figure 9:
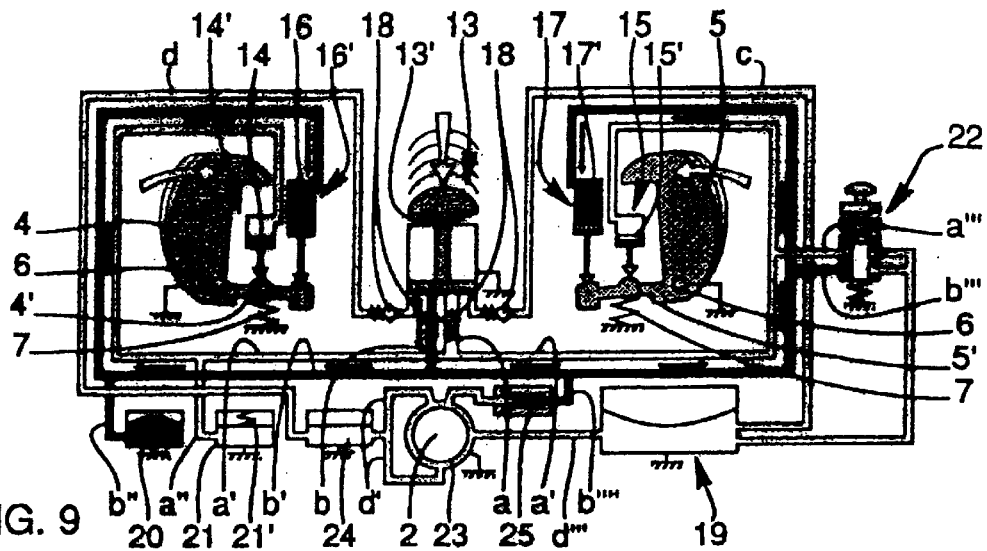
FIG. 9 shows schematically the hydraulic circuit in a gripping phase of the plate by the cleats.

4th phase: Gripping (FIG. 9)

When the piston of the principal jack 13 again descends, the conduit a, already supplied, remains under pressure thanks to the non-return valve 18. It is thus the conduit b which in turn is supplied. The hydraulic liquid, after having filled the pressure accumulator 20, causes the gripping jacks 16, 17 progressively to act, until the plate 13 will be completely gripped and can no longer swing. The feet of the user are then maintained in a natural position selected by the user.

Figure 10:
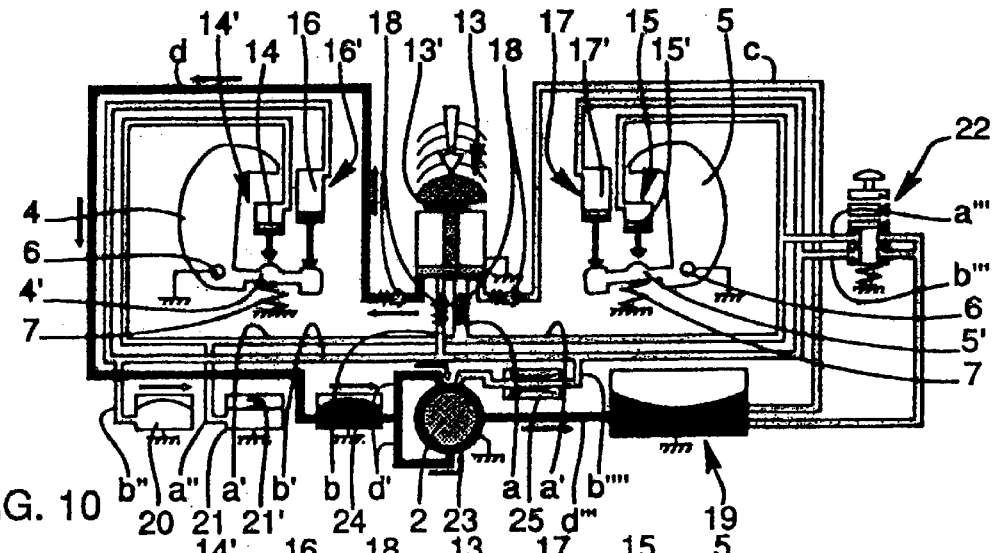
FIG. 10 shows schematically the hydraulic circuit in a phase of actuating the hydraulic bearing of the pedal.

5th phase: Hydrostatic bearing (FIG. 10)

Parallel to phases 2 to 4, the return conduit d is also supplied when the piston of the principal jack 13 descends. The hydraulic liquid is supplied under pressure into the recess 23 where it carries the axle of the pedal 2. This hydrostatic bearing permits reducing friction during the phase of oscillation of the piston of the principal jack. The pressure accumulator 24 permits continuously maintaining the bearing under pressure. Upon starting and upon breaking, the cushion of the pedal axle alone ensures the guidance and rotation of the axle but remains lubricated by the hydraulic liquid. As already mentioned, a conduit d''' permits the hydraulic liquid in the bearing to return to the reservoir 19.

Figure 11:
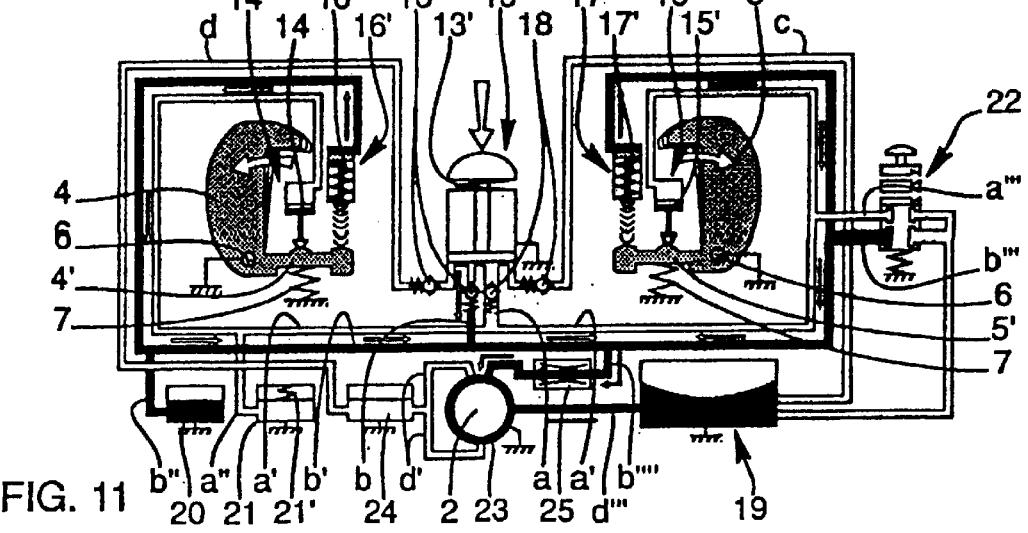
FIG. 11 shows schematically the hydraulic circuit in a phase of ungripping the plate.

6th phase: Unclamping (FIG. 11)

When the user ceases to pedal, the conduit b purges itself. The constriction 25 permits the liquid to return to the reservoir 19 by passing through the hydrostatic bearing to lubricate it. Following the pressure drop in the conduit b, the pistons of the gripping jacks 16, 17 will, under the influence of the action of the respective resilient members 16', 17', progressively return to their retracted position, which gives rise to the unlocking of the front and rear cleats 4, 5. However, the cleats will not open completely because the coupling jacks 14, 15 connected to the conduit a remain under pressure. The user can then again swing his foot to, for example, reposition it and start out again.

Figure 12:
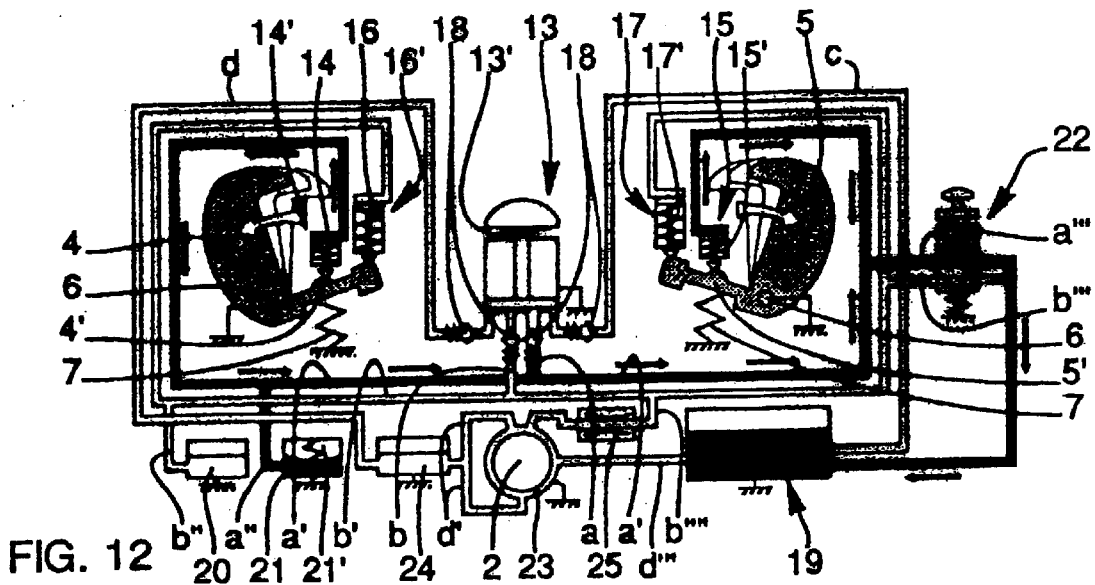
FIG. 12 shows schematically the hydraulic circuit in a phase of uncoupling the plate.

7th phase: Uncoupling (FIG. 12)

To uncouple, the user then need only pivot the foot outwardly by 10 to 15° thereby to actuate the control member 22 constituted by a slide. The liquid in the conduits a, b will then rapidly return to the reservoir 19 through the branch conduits a''', b''', which gives rise to the abrupt reentry of the piston rods of the coupling jacks 14, 15 under the influence of the action of the respective resilient members 14', 15'. Front and rear cleats then will move apart under the influence of the action of the respective return springs 7 thereby to free completely the plate 3 and the foot can be released.

It is also to be noted that the pressure accumulator 20 has been inserted in the conduit a for safety reasons. Thus, in the case of emergency uncoupling, the user can, when finding himself in clamping phase 4, by exerting a substantial lateral force, space apart the cleats 4, 5 from each other thereby to free, in a conventional manner, the plate 3 from its grip. It will be supposed in this case that the phase 6 is carried out practically simultaneously from the moment at which the user ceases to pedal.

Such a release can thus be triggered by a fall during which the sole of the foot is turned outwardly or inwardly.

It is evident that modifications may be brought to the embodiment of the coupling described above without thereby departing from the scope of the invention. In the described embodiment, both the rear cleat and the front cleat are movable, whereas it is of course possible to provide an embodiment in which only the rear cleat is movable as is the case in conventional quick couplings.

In a modification not shown in the drawings, the coupling jacks 14, 15 have been omitted and only the gripping jacks ensure the securement of the plate against the pedal.

Studies have moreover shown that the weight of a pedal provided with the securement having a hydraulic circuit according to the invention is of the same order of magnitude as that of existing automatic pedals.

There is thus obtained a securement device with excellent safety which has the advantage of facilitating the emplacement of the plate on the pedal and to adjust the position of the latter upon coupling, before clamping properly so-called.

What is claimed is:

1. A bicycle pedal with a rapid securement device for a shoe, the bicycle pedal comprising:
    a main pedal portion with a pedal upper surface and a plate securement means; and
    a plate secured on the pedal upper surface of the main pedal portion by the plate securement means, the plate having an upper surface adapted to have a shoe rest upon the upper surface;
    the securement means comprising
        a front cleat and a rear cleat, at least the rear cleat being movably mounted in a direction perpendicular to an axis of the main pedal portion, and
        a control means,
        the control means comprising a hydraulic circuit integrated into the main pedal portion and hydraulic control members disposed on the main pedal portion and actuated by the plate.

2. The bicycle pedal of claim 1, wherein
    the securement means further comprise resilient means attached to each of the front and rear cleats, and the resilient means are configured to constant urge apart the front and rear cleats.

3. The bicycle pedal of claim 1, further comprising
    a pedal axle; and
    a hydrostatic bearing located on the pedal axle and supplied by the hydraulic circuit.

4. The bicycle pedal of claim 3, further comprising
    a reservoir; and
    a return conduit connected to the reservoir and the hydrostatic bearing.

5. The bicycle pedal of claim 1, wherein
    the control members comprise a principal jack actuated by a lower surface of the plate,
    and further comprising
        an intake conduit connecting a reservoir of hydraulic liquid to the principal jack;
        a return conduit connected to the principal jack; and
        another conduit connecting the principal jack to at least one of the front and rear cleats,
        the another conduit connecting to a gripping jack for the rear cleat, and
        the another conduit having a first branch opening into a pressure accumulator.

6. The bicycle pedal of claim 5, wherein the principal jack comprises an inflatable dome of an elastic material.

7. The bicycle pedal of claim 5, wherein the another conduit further comprises a second branch connecting the reservoir to the gripping jack, the second branch comprising a constriction.

8. The bicycle of claim 7, further comprising
    a pedal axle; and
    a hydrostatic bearing located on the pedal axle and wherein the second branch of the another conduit is connected to the hydrostatic bearing.

9. The bicycle pedal of claim 5, wherein
    the principal jack is connected by a further conduit to one of the front and rear cleats,
    the further conduit connects to a coupling jack for the rear cleat, and
    the further conduit has a first branch opening into a pre-stressed pressure accumulator.

10. The bicycle pedal of claim 9, wherein a cross-section of the further conduit connected to the coupling jack is greater than a cross-section of the another conduit connected to the gripping jack so that in operation the coupling jack is actuated before the gripping jack.

11. The bicycle pedal of claim 9, wherein each of the intake conduit, the return conduit, the another conduit, and the further conduit comprise a non-return valve.

12. The bicycle pedal of claim 9, wherein
    the front cleat is movably mounted,
    the front cleat is connected to the principal jack by the another conduit,
    the front cleat is connected to another gripping jack by the another conduit, and
    the front cleat is connected to another coupling jack by the further conduit.

13. The bicycle pedal of claim 9, wherein
    the plate comprises a lateral appendage,
    one of the hydraulic control members is arranged for freeing the plate and is located on the pedal upper surface, and
    the lateral appendage and the one hydraulic control member for freeing the plate are placed so that the lateral appendage actuates the one hydraulic control member for freeing the plate.

14. The bicycle pedal of claim 13, wherein the one hydraulic control member for freeing the plate comprises a slide having an open position and a closed position, the further conduit having a second branch connected to the slide, the another conduit having a second branch connected to the slide, the slide being connected to the reservoir in the open position of the slide so as to establish communication of the another and the further conduits with the reservoir.

15. The bicycle pedal of claim 14, wherein the movable cleat comprises a cleat body and a lever extending substantially perpendicular to the cleat body, the lever is arranged to co-act with at least one of the gripping jack, the coupling jack, the another gripping jack, and the another coupling jack, and the co-action is for controlling an approach of the front and rear cleats to each other in securement of the plate to the main pedal portion.

16. The bicycle pedal of claim 1, wherein each of the principal jack, the gripping jack, the coupling jack, the another gripping jack, and the another coupling jack comprise a membrane.

17. The bicycle of claim 16, further comprising a pedal axle; and a hydrostatic bearing located on the pedal axle and connected downstream of the pressure accumulator.

* * * * *